3,172,881
TITANIUM HALIDE-ORGANOMETAL-ORGANO-
METAL IODIDE CATALYST FOR PRODUC-
TION OF CIS 1,4-POLYBUTADIENE
Ralph C. Farrar, Jr., and Floyd E. Naylor, Bartlesville,
Okla., assignors to Phillips Petroleum Company, a corporation of Delaware
No Drawing. Filed Nov. 20, 1961, Ser. No. 153,750
7 Claims. (Cl. 260—94.3)

This invention relates to a process for polymerizing 1,3-butadiene so as to obtain a rubbery polymer. In one aspect, the invention relates to a process for producing cis 1,4-polybutadiene.

Numerous methods are described in the literature for polymerizing 1,3-butadiene, including emulsion polymerization, alkali metal catalyzed polymerization, and alfin-catalyzed polymerization. The polybutadiene products produced by these processes contain varying amounts of cis 1,4-addition, trans 1,4-addition and 1,2-addition. However, until quite recently, no polymer of butadiene had been produced which contained more than about 50 percent cis 1,4-configuration. It has recently been discovered, as disclosed in the copending U.S. patent application Serial No. 578,166, filed on April 16, 1956, by R. P. Zelinski and D. R. Smith, that a polybutadiene containing at least 85 percent cis 1,4-addition can be produced by polymerizing 1,3-butadiene with a catalyst comprising a trialkylaluminum and titanium tetraiodide. The present invention is concerned with the discovery of another novel catalyst system which makes it possible to produce a polybutadiene having a high cis 1,4-content.

It is an object of this invention to provide a novel process for producing a rubbery polymer of 1,3-butadiene.

Another object of the invention is to provide a process for polymerizing 1,3-butadiene in which the rubbery polymer product produced contains a high percentage of cis 1,4-addition.

A further object of the invention is to provide a novel catalyst system to be used in the preparation of a polybutadiene having high cis 1,4-content, e.g., from 85 to 98 percent and higher.

Other and further objects and advantages of the invention will become apparent to those skilled in the art upon consideration of the accompanying disclosure.

Broadly speaking, the process of this invention comprises contacting 1,3-butadiene with a catalyst system comprising (1) an organometal compound having the formula $R_nM$ wherein R is an alkyl, cycloalkyl, aryl, cycloalkylalkyl, aralkyl, alkylcycloalkyl, arylcycloalkyl, alkaryl or cycloakylaryl radical, each R group containing up to and including 20 carbon atoms, M is a metal selected from the group consisting of magnesium and aluminum, and $n$ is an integer equal to the valence of the metal, M, (2) a titanium halide selected from the group consisting of the chlorides and the bromides of titanium, especially titanium tetrachloride and titanium tetrabromide, and (3) an organometal iodide of the formula $R_xM'_yI_z$ wherein R is an organic radical as hereinbefore defined, M' is a metal selected from the group consisting of aluminum, zinc, cadmium, mercury, gallium, indium, and thallium, I is iodine, $x$ and $z$ are integers that can be 1, 2 or 3 and $y$ is an integer that can be 1 or 2 and when $y=1$, $x+z=$ the valence of metal M' and when $y=2$, $x+z=$ twice the valence of metal M'.

Examples of suitable organometal compounds include dimethylmagnesium,
diisobutylmagnesium,
methylethylmagnesium,
didecylmagnesium,
dipentadecylmagnesium,
dieicosylmagnesium,
dicyclopentylmagnesium,
dicyclooctylmagnesium,
cyclohexylcyclooctylmagnesium,
dicyclohexylmagnesium,
diphenylmagnesium,
di(1-naphthyl)magnesium,
dicyclopropylmethylmagnesium,
di(4-cyclobutylbutyl)magnesium,
di(4-cycloheptylhexyl)magnesium,
di(6-cyclohexyldecyl)magnesium,
dibenzylmagnesium,
di(3-phenylpentyl)magnesium,
di(4,6-diphenyloctyl)magnesium,
di(2-methylcyclobutyl)magnesium,
di(4-pentylcyclohexyl)magnesium,
di(4-dodecylcyclooctyl)magnesium,
di(2-phenylcyclobutyl)magnesium,
di(3-phenylcyclohexyl)magnesium,
di(2,4-diphenylcyclooctyl)magnesium,
di(2-methylphenyl)magnesium,
di(2-methyl-4-butylphenyl)magnesium,
di(4-decylphenyl)magnesium,
di(2,4-diheptylphenyl)magnesium,
di(4-cyclobutylphenyl)magnesium,
di(2,4-dicyclopentylphenyl)magnesium,
di(2,4-dicyclooctylphenyl)magnesium,
trimethylaluminum,
triisobutylaluminum,
trioctylaluminum,
tridodecylaluminum,
trieicosylaluminum,
methyldiethylaluminum,
tricyclobutylaluminum,
tricyclohexylaluminum,
tri(10-cyclopentyldecyl)aluminum,
triphenylaluminum,
tri(1-naphthyl)aluminum,
diphenyl-1-naphthylaluminum,
tri(4-methylcyclohexyl)aluminum,
tri(2,4,6-tripropylcycloheptyl)aluminum,
tri(2,4-dipentylcyclohexyl)aluminum,
tribenzylaluminum,
tri(6-phenylhexyl)aluminum,
tri[9(2-naphthyl)nonyl]aluminum,
tri(2-methylcyclobutyl)aluminum,
tri(3-isobutylcyclohexyl)aluminum,
tri(2,4,6-tributylcyclooctyl)aluminum,
tri(2-phenylcyclopentyl)aluminum,
tri(2,4-diphenylcyclohexyl)aluminum,
tri[4(1-naphthyl)cycloheptyl]aluminum,
tri(2-methylphenyl)aluminum,
tri(4-pentylphenyl)aluminum,
tri(2,4-dimethyl-6-ethylphenyl)aluminum,
tri(2,4-diheptylphenyl)aluminum,
tri(2-cyclobutylphenyl)aluminum,
tri(2,4-dicyclopentylphenyl)aluminum,
tri[2-cyclohexyl(1-naphthyl)]aluminum,
tri(2,4-cycloheptylphenyl)aluminum, and the like.

Organometal iodides employed as components in the catalyst systems of this invention are not of themselves polymerization catalysts. They serve as iodine donors in organometal-titanium halide systems which otherwise would give polybutadiene of significantly lower cis-1,4-structure. These organometal iodides, particularly organoaluminum iodides, afford a convenient and less expensive source of iodine than has heretofore been employed, e.g., titanium tetraiodide and elemental iodine. They can be readily synthesized by the reaction of aluminum metal with an organic iodide and the resulting reaction mixture used, without isolating the product, as a catalyst component.

As stated above, the organometal iodides can be represented by the formula $R_xM'_yI_z$ wherein $x$ and $z$ are integers which can be 1, 2, or 3 and $y$ is an integer which can be 1 or 2; where $y=1$, $x+z=$ the valence of the metal M'; and when $y=2$, $x+z=$ twice the valence of the metal M'. Thus with the divalent metals, zinc, cadmium, and mercury, iodides are of the type RMI whereas with the trivalent metals, aluminum, gallium, indium, and thallium, iodides can be of the types $RMI_2$, $R_2MI$, and $R_3M_2I_3$, the latter being a mixture of $RMI_2$ and $R_2MI$ and being referred to as an organometal sesquiiodide.

Examples of organometal iodides include the following: ethylzinc iodide, n-heptylzinc iodide, dodecylzinc iodide, eicosylzinc iodide, cyclopentylzinc iodide, benzylzinc iodide, 4-methylcyclohexylzinc iodide, n-hexylcadmium iodide, tridecylcadmium iodide, 2-cyclohexylethylcadmium iodide, 3-phenyl-n-propylcadmium iodide, isopropylmercuric iodide, phenylmercuric iodide, 4-phenylcyclohexylmercuric iodide, 3-cyclohexylphenylmercuric iodide, methylaluminum diiodide, n-pentylaluminum diiodide, tetradecylaluminum diiodide, 1-naphthylaluminum diiodide, methylethylaluminum iodide, diisobutylaluminum iodide, di-tert-butylaluminum iodide, di(3,5-dimethylphenyl)aluminum iodide, dibenzylaluminum iodide, isobutylaluminum sesquiiodide, cyclohexylaluminum sesquiiodide, n-dodecylaluminum sesquiiodide, benzylaluminum sesquiiodide, ethylgallium diiodide, 3-ethylcyclopentylgallium diiodide, 2,4,6-trimethylphenylgallium diiodide, n-nonylgallium diiodide, di-tert-butylgallium iodide, didecylindium iodide, phenyl(cyclohexyl)indium iodide, dieicosylindium iodide, diisobutylthallium iodide, isobutylthallium sesquiiodide, n-hexylgallium sesquiiodde, and dibenzylthallium iodide.

Examples of specific catalyst systems which can be employed in the practice of this invention include the following: diethylmagnesium, titanium tetrachloride and ethylzinc iodide; diphenylmagnesium, titanium tetrabromide and isobutylzinc iodide; dicyclopentylmagnesium, titanium tetrachloride, and benzylzinc iodide; trimethylaluminum, titanium tetrachloride and methylzinc iodide; triisobutylaluminum, titanium tetrabromide and dicycloheptylzinc iodide; tricyclohexylaluminum, titanium tetrachloride and 4-methylcyclohexylzinc iodide; tribenzylaluminum, titanium tetrachloride and methylcadmium iodide; di(4-phenylcyclohexyl)magnesium, titanium tetrabromide, and butylcadmium iodide; dicyclopentylmagnesium, titanium tetrachloride and phenylcadmium iodide; triphenylaluminum, titanium tetrabromide and eicosylcadmium iodide; di(3,5-diphenylheptyl)magnesium, titanium tetrachloride and propylmercuric iodide; trihexylaluminum, titanium tetrabromide and phenylmercuric iodide; dibenzylmagnesium, titanium tetrachloride and cyclopentylmercuric iodide; triisobutylaluminum, titanium tetrabromide and eicosylmercuric iodide; tricyclopentylaluminum, titanium tetrachloride and methylaluminum diiodide; dibenzylmagnesium, titanium tetrabromide and phenylaluminum diiodide; trimethylaluminum, titanium tetrachloride and decylaluminum diiodide; di(2,4-diethylphenyl)magnesium, titanium tetrabromide and 1-naphthylaluminum diiodide; tricyclopentylaluminum, titanium tetrachloride and dimethylaluminum iodide; diphenylmagnesium, titanium tetrabromide and dicyclooctylaluminum iodide; triisobutylaluminum, titanium tetrachloride and methylaluminum sesquiiodide; triisobutylaluminum, titanium tetrachloride and isobutylaluminum sesquiiodide; triphenylaluminum, titanium tetrabromide and cyclohexylaluminum sesquiiodide; dimethylmagnesium, titanium tetrachloride and propylgallium diiodide; tributylaluminum, titanium tetrabromide and diphenylgallium iodide; dihexylmagnesium, titanium tetrachloride and pentylgallium sesquiiodide; trimethylaluminum, titanium tetrabromide and methylindium diiodide; dibutylmagnesium, titanium tetrachloride and diphenylindium iodide; triisobutylaluminum, titanium tetrabromide and hexylindium sesquiiodide; dicyclopentylmagnesium, titanium tetrachloride and ethylthallium diiodide; tri(1-naphthyl)aluminum, titanium tetrabromide and diphenylthallium iodide; dibenzylmagnesium, titanium tetrachloride and isobutylthallium sesquiiodide; and the like.

The amount of the organometal employed in the catalyst system is dependent upon the choice of either organomagnesium compounds or organoaluminum compounds. If organomagnesium compounds are used, the mole ratio of the organomagnesium compound to the titanium tetrahalide compound is in the range of 1.05:1 to 2:1 with a range of 1.1:1 to 1.5:1 being preferred. If organoaluminum compounds are used, the mole ratio of the organoaluminum compound to the titanium tetrahalide compound is in the range of 2:1 to 20:1 with a range of 3:1 to 10:1 being preferred. The mole ratio of the titanium tetrahalide compound to the organometal iodide compound is in the range of 0.05:1 to 1:1 with a range of 0.1:1 to 0.5:1 being preferred. In any event, an excess of the organometal compound is utilized, i.e., the mole ratio of organometal compound to the total molar quantities of the titanium tetrahalide plus the organometal iodide is greater than 1.

The catalyst level can vary over a rather wide range and will ordinarily be in the range of from 1 to 20 gram millimoles of the organometal, $R_nM$, per 100 grams of 1,3-butadiene to be polymerized. The actual catalyst level used will, in general, be determined by the molecular weight of the product which is desired.

The polymerization process of this invention is usually carried out in the presence of a diluent. Diluents suitable for use in the process are hydrocarbons which are substantially inert and non-detrimental to the polymerization reaction. Suitable diluents include aromatics, such as benzene, toluene, xylene, ethylbenzene, and mixtures thereof. It is also within the scope of the invention to use straight and branched chain paraffins which contain up to and including 12 carbon atoms per molecule. Examples of paraffins which can be utilized include propane, normal butane, normal pentane, isopentane, normal hexane, isohexane, 2,2,4-triethylpentane (isooctane), normal decane, and the like. Mixtures of these paraffinic hydrocarbons can also be employed as diluents in carrying out the process of this invention. Cycloparaffins, such as cyclohexane and methylcyclohexane, can also be used. Furthermore, mixtures of any of the aforementioned hydrocarbons can be used as diluents. It is usually preferred to carry out the polymerization in the presence of an aromatic hydrocarbon since polymers having the highest cis contents are produced when operating in this manner.

The polymerization process of this invention can be carried out at temperatures varying over a rather wide range, e.g., from —100 to 250° F. It is usually preferred to operate at a temperature in the range of —30 to 160° F. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is conducted. However, higher reactor pressures can be employed if desired, these pressures being obtained by some such suitable method as the pressurization of the reactor with a gas which is inert with respect to the polymerization reaction without changing the polymerization process. It is to be understood also that it is within the scope of the invention to conduct the polymerization in the solid phase.

The process of this invention can be carried out as a batch process by charging 1,3-butadiene into a reactor containing catalyst and diluent. Although any suitable charging procedure can be used, it is usually preferred to add the catalyst components to a reactor containing diluent and 1,3-butadiene. The catalyst components can be dissolved in the diluent and then passed to the reactor. The individual catalyst components can be added to the reactor separately, or they can be mixed with each other prior to introduction into the reactor. It is to be understood that it is within the scope of the invention to preform the catalyst by reacting the catalyst components within a separate catalyst preparation vessel. The resulting reaction product can then be charged to the reactor containing monomer and diluent or these latter materials can be added after the catalyst. The process can also be carried out continuously by maintaining the above-mentioned concentrations of reactants in the reactor for a suitable residence time. The residence time in a continuous process will, of course, vary within rather wide limits, depending upon such variables as temperature, pressure, the ratio of catalyst components and the catalyst concentrations. In a continuous process, the residence time usually falls within the range of 1 second to 10 hours when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which may tend to inactivate the catalyst. Any of the known means for removing such contaminants can be used. Furthermore, when a diluent is employed in the process, it is preferred that this material be substantially free of impurities such as water, oxygen and the like. In this connection it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, the catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to recovery of the polymer. After addition of the catalyst-inactivating material and the antioxidant, the polymer present in the solution can then be separated by the addition of an excess of a material such as ethyl alcohol or isopropyl alcohol. When the process is carried out continuously, the total effluent from the reactor can be pumped from the reactor to a catalyst-inactivating zone wherein the reactor effluent is contacted with a suitable catalyst-inactivating material such as an alcohol. When an alcohol is used as a catalyst-inactivating material, it also functions to precipitate the polymer. In the event catalyst-inactivating materials are employed which do not perform this dual role, a suitable material, such as an alcohol, can be added to precipitate the polymer. It is, of course, to be realized that it is within the scope of the invention to employ other suitable means to recover the polymer from solution. After separation from the water or alcohol and diluent by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used in compounding the rubber of this invention.

It is also within the scope of the invention to blend the polymers with other polymeric materials such as natural rubber, cis 1,4-polyisoprene, polyethylene, and the like. As mentioned hereinbefore, the polymers of this invention have a high cis-content which renders them very suitable for applications requiring low hysteresis, high resiliency, and low freeze point. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative example which is not intended, however, to be unduly limitative of the invention.

In the structural analyses of polymer products described herein, a polymer sample of the polymerization product to be tested was dissolved in carbon disulfide to form a solution having 25 grams of polymer per liter of solution. The infrared spectrum of the solution (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction cofficient (liters-mols$^{-1}$-centimeters$^{-1}$); E=extinction (log $I_0/I$); $t$=path length (centimeters); and $c$=concentration (mols double bond/liter). The extinction was determined at 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

The inherent viscosities of the polymerization products were determined by placing one tenth gram of polymer in a wire cage made from 80 mesh screen and placing the wire cage in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

*Example*

Isobutylaluminum sequiiodide was prepared by the reaction of aluminum powder with isobutyl iodide in the presence of a minor amount of triisobutylaluminum. Fifty milliliters (43 grams) of dry toluene was charged to a bottle-type reactor which was then purged with nitrogen, 0.597 gram (22.1 millimoles) of aluminum powder was added, the bottle was capped, and 3.6 milliliters (31.5 millimoles) of isobutyl iodide was introduced from a syringe. The bottle was pressured to 25 p.s.i. with nitrogen and placed in a 50° C. bath where the reactants were agitated. There was no evidence of reaction after 16 hours. At this time one millimole of triisobutylaluminum was introduced. After 24 hours the color of the reaction mixture had changed from silver to golden. The temperature was increased to 70° C. and maintained at this level for 126 hours. The mixture was titrated for iodine by adding a sample to an excess of a solution of silver nitrate which had been acidified with nitric acid and back titrating with ammonium thiocyanate. It was found to be 0.045 molar in iodine.

The aluminum powder from the above-described reaction mixture was allowed to settle and the supernatant liquid was withdrawn and used as the initiator in a series of runs for the polymerization of butadiene. The recipe was as follows:

| | |
|---|---|
| 1,3-butadiene, parts by weight | 100 |
| Toluene, parts by weight | 1200 |
| Triisobutylaluminum (TBA), millimoles | 2.3 |
| Titanium tetrachloride (TTC), millimoles | 0.29 |
| Isobutylaluminum sequiiodide (BASI), millimoles | Variable |
| Temperature, °C. | 5 |
| Time, hours | 2 |

Toluene was charged to the reactor after which it was purged with nitrogen, butadiene was added, and then triisobutylaluminum, isobutylaluminum sesquiiodide, and titanium tetrachloride were introduced in the order named. After two hours the reactions were shortstopped with one part by weight per 100 parts of polymer of 2,2'-methylene-bis(4-methyl-6-tert-butylphenol) dissolved in isopropyl alcohol. The polymers were coagulated in isopropyl alcohol and dried. A summary of the runs is presented in the following table:

| Run No. | BASI, mmoles | TBA:TTC: BASI, Mole Ratio | TTC:BASI Mole Ratio | Conv., percent |
|---|---|---|---|---|
| 1 | 0.4 | 8:1:1.4 | 0.7:1 | 4.5 |
| 2 | 0.5 | 8:1:1.7 | 0.58:1 | 18.5 |
| 3 | 0.6 | 8:1:2.1 | 0.48:1 | 33 |

The polymer prepared in Run 3, for example, had the following properties:

| | |
|---|---|
| Inherent viscosity | 2.55 |
| Microstructure, percent: | |
| Cis, by difference | 96.5 |
| Trans | 0.9 |
| Vinyl | 2.6 |

Further examples of the invention are shown in the following tabulation, the runs indicated being conducted as in the foregoing example, Run 3, except as otherwise specified, and with similar results:

| Run | Catalyst | Diluent | Reaction Temperature, °C. |
|---|---|---|---|
| 4 | Triethylaluminum<br>Titanium tetrabromide<br>Di-n-butylaluminum iodide | Benzene | 75 |
| 5 | Triphenylaluminum<br>Titanium tetrachloride<br>Di-n-propylaluminum iodide | m-Xylene | 80 |
| 6 | Di-n-butylmagnesium<br>Titanium tetrachloride<br>Ethylaluminum sesquiiodide | Cyclohexane | 85 |
| 7 | Diethylmagnesium<br>Titanium tetrabromide<br>Diisobutylaluminum iodide | Ethylbenzene | 78 |

As many posisble embodiments can be made of this invention without departing from the scope thereof, it is to be understood that all matter herein set forth is to be interpreted as illustrative and not as unduly limiting the invention.

We claim:

1. A process for preparing a rubbery polybutadiene containing in the range of 85 to 98 percent cis 1,4-addition which comprises contacting 1,3-butadiene with a catalyst system which forms on mixing (1) an organometal having the formula $R_nM$ wherein R is selected from the group consisting of alkyl, cycloalkyl, aryl, cycloalkylalkyl, aralkyl, alkylcycloalkyl, arylcycloalkyl, alkaryl and cycloalkylaryl radicals, each R group containing up to and including 20 carbon atoms, M is a metal selected from the group consisting of magnesium and aluminum and n is an integer equal to the valence of metal, M, (2) a titanium tetrahalide selected from the group consisting of titanium tetrachloride and titanium tetrabromide, and (3) an organometal iodide of the formula $R_xM'_yI_z$ wherein R is an organic radical as hereinbefore defined, M' is a metal selected from the group consisting of zinc, cadmium, mercury, aluminum, gallium, indium, and thallium, I is iodine, x and z are integers from 1 to 3 and y is an integer from 1 to 2 and when $y=1$, $x+z=$the valence of metal M' and when $y=2$, $x+z=$twice the valence of metal M', the mole ratio of the $R_nMg$ compound to said titanium tetrahalide being in the range of 1.05:1 to 2:1, the mole ratio of the $R_nAl$ compound to said titanium tetrahalide being in the range of 2:1 to 20:1, the mole ratio of said titanium tetrahalide to said organometal iodide compound being in the range of 0.05:1 to 0.7:1, said contacting occurring in the presence of a hydrocarbon diluent at a temperature range of −100 to 250° C. and under autogenous pressure; and recovering the rubbery cis-polybutadiene so produced.

2. A process according to claim 1 wherein the catalyst is formed by mixing triisobutylaluminum, titanium tetrachloride and isobutylaluminum sesquiiodide.

3. A process for preparing a cis-polybutadiene which comprises contacting 1,3-butadiene with a catalyst formed by mixing triisobutyl aluminum, titanium tetrachloride and isobutylaluminum sesquiiodide, the mole ratio of said triisobutylaluminum to titanium tetrachloride being in the range of 3:1 to 10:1, and the mole ratio of said titanium tetrachloride to isobutylaluminum sesquiiodide being in the range of 0.1:1 to 0.5:1, said contacting occurring in the presence of a hydrocarbon diluent at a temperature in the range of −30 to 160°F. and under autogenous pressure; and recovering the cis-polybutadiene so produced.

4. A catalyst composition which forms on mixing from 2 to 20 moles of triisobutylaluminum, 1 mole of titanium tetrachloride and 1.4 to 20 moles of isobutylaluminum sequiiodide.

5. A catalyst composition which forms on mixing 2 to 20 moles of triphenylaluminum, 1 mole of titanium tetrachloride, and 1.4 to 20 moles of di-n-propylaluminum iodide.

6. A catalyst composition which forms on mixing from 1.05 to 2 moles of di-n-butylmagnesium, 1 mole of titanium tetrachloride and 1.4 to 20 moles of ethylaluminum sesquiiodide.

7. A catalyst composition which forms on mixing 1.05 to 2 moles of diethylmagnesium, 1 mole of titanium tetrabromide, and 1.4 to 20 moles of diisobutylaluminum iodide.

References Cited in the file of this patent

UNITED STATES PATENTS

| | | |
|---|---|---|
| 2,976,271 | Lippincott et al. | Mar. 21, 1961 |
| 3,076,795 | Hall | Feb. 5, 1963 |
| 3,095,406 | Short et al. | June 25, 1963 |

FOREIGN PATENTS

| | | |
|---|---|---|
| 591,994 | Belgium | Dec. 1960 |

(Corresponds to German 1,113,311, Aug. 31, 1961)

| | | |
|---|---|---|
| 1,256,231 | France | Feb. 6, 1961 |

Notice of Adverse Decision in Interference

In Interference No. 95,798 involving Patent No. 3,172,881, R. C. Farrar, Jr., and F. E. Naylor, TITANIUM HALIDE-ORGANOMETAL-ORGANOMETAL IODIDE CATALYST FOR PRODUCTION OF CIS 1,4-POLYBUTADIENE, final judgment adverse to the patentees was rendered July 22, 1968, as to claim 1.

[*Official Gazette September 24, 1968.*]